US006988540B2

(12) United States Patent
Jensen et al.

(10) Patent No.: US 6,988,540 B2
(45) Date of Patent: Jan. 24, 2006

(54) SOLID BUFFER RODS IN HIGH TEMPERATURE HEAT EXCHANGER

(75) Inventors: Joseph Mead Jensen, Torrance, CA (US); Thomas Alexander Lee, Redondo Beach, CA (US); Hai Truong Ly, Fullerton, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/698,716

(22) Filed: Oct. 30, 2003

(65) Prior Publication Data

US 2004/0194932 A1 Oct. 7, 2004

Related U.S. Application Data

(60) Provisional application No. 60/451,062, filed on Feb. 25, 2003.

(51) Int. Cl.
*F28F 13/00* (2006.01)

(52) U.S. Cl. .................. 165/135; 165/134.1; 165/82
(58) Field of Classification Search ............. 165/134.1, 165/135, 159, 161, 82
See application file for complete search history.

(56) References Cited

U.S. PATENT DOCUMENTS

| | | | | | |
|---|---|---|---|---|---|
| 1,454,053 | A | * | 5/1923 | Jones ......................... | 165/161 |
| 2,655,350 | A | * | 10/1953 | Gaylord, Jr. ................ | 165/160 |
| 3,667,220 | A | | 6/1972 | Dekeyser | |
| 3,785,435 | A | * | 1/1974 | Stein et al. ................. | 165/166 |
| 4,127,389 | A | * | 11/1978 | Hackemesser et al. ...... | 165/159 |
| 4,697,633 | A | | 10/1987 | Darragh et al. | |
| 4,811,783 | A | * | 3/1989 | Linzer et al. ............ | 165/134.1 |
| 4,886,871 | A | * | 12/1989 | Satake et al. ............... | 528/226 |
| 5,101,892 | A | * | 4/1992 | Takeuchi et al. ............ | 165/159 |
| 5,291,944 | A | * | 3/1994 | Sanz et al. .................. | 165/159 |
| 5,551,507 | A | | 9/1996 | Vogel et al. | |
| 5,653,282 | A | * | 8/1997 | Hackemesser et al. ... | 165/134.1 |

FOREIGN PATENT DOCUMENTS

| | | |
|---|---|---|
| DE | 975 508 C | 12/1961 |
| JP | 05 187792 A | 7/1993 |

OTHER PUBLICATIONS

International Search Report, May 25, 2005.
Krishnan et al., "Variable Pitch Tube Layout Concept for Shell and Tube Heat Exchanger". Design and Operation of Heat Exchangers, Proceedings of the Eurotherm Seminar, Feb. 27, 1991, pp. 64–73, XP000677730.

* cited by examiner

*Primary Examiner*—Teresa J. Walberg
(74) *Attorney, Agent, or Firm*—Oval Caglar, Esq.

(57) ABSTRACT

A heat exchanger for transferring energy from a second fluid to a first fluid has a plurality of tubes to carry one of the fluids and a layer of thermal buffer members on one side of the tubes to act as a buffer to reduce high thermal stresses that may be caused by global temperature patterns and localized high gradients that occur in system transients such as start up and shutdown. Conventional heat exchangers often have a short lifespan due to high thermal stresses acting on the core of the heat exchanger. The heat exchanger uses the thermal buffer members as an increased thermal mass to cause the temperature of the heat exchanger core to change in a more gradual manner, thereby reducing thermal stresses.

32 Claims, 4 Drawing Sheets

US 6,988,540 B2

SOLID BUFFER RODS IN HIGH TEMPERATURE HEAT EXCHANGER

CROSS-REFERENCE TO RELATED APPLICATIONS

This application claims the benefit of provisional application No. 60/451,062, filed on Feb. 25, 2003.

GOVERNMENTAL RIGHTS

This invention was made with Government support under contract number DAAE07-03-3-0002 awarded by the United States Army-TACOM. The Government has certain rights in this invention.

BACKGROUND OF THE INVENTION

The present invention generally relates to a heat exchanger that lessens the thermal shock to heat exchanger tubes by placing a relatively large thermal mass in front of the core to act as a buffer to reduce high thermal stresses that may be caused by global temperature patterns and localized high gradients that occur in system transients such as start up and shutdown and power transitions.

Heat exchangers that are located in a high temperature environment are subject to high thermal stresses, leading to limited life. This limited life decreases performance via increased leakage and greatly increased life cycle costs of the equipment. Precoolers in ECS (environmental control system) bleed circuits and recuperators placed in a turbine exhaust flow path are examples of applications that experience limitations on heat exchanger life. High thermal stresses may be caused by global temperature patterns and localized high gradients that occur in system transients such as start up and shutdown. Furthermore, in tubular units, large thermal gradients may cause localized buckling that can cause catastrophic failure of the heat exchanger core.

U.S. Pat. No. 3,785,535 discloses a conventional annular heat exchanger with plates graduated in thickness at the ends. Damping of the thermal effect of the incoming exhaust gas flow is achieved by using the graduated plates of varying thickness near the ends of the heat exchanger. The damping effect occurs in the stack-height direction and is localized. The patent does not disclose lessening the thermal impact upon the overall heat exchanger core.

U.S. Pat. No. 4,697,633 discloses a conventional heat exchanger having a thermally balanced restraint system. Tie rods are placed in the fluid stream to force the tie rod temperature to follow the bulk temperature of the core of a plate heat exchanger construction. This is done to reduce the thermal stresses on the heat exchanger and the tie rod as the thermal expansion increases of the core and the tie rods are made more equal. In this configuration, the tie rods restrain the core and act as a supporting structural member that may experience and induce upon the core thermal loads due to being constrained.

As can be seen, there is a need for an improved heat exchanger where high thermal stresses on the heat exchanger core, especially during startup and shutdown, may be avoided, thereby increasing the lifespan of the heat exchanger unit.

SUMMARY OF THE INVENTION

In one aspect of the present invention, a heat exchanger, comprises a plurality of tubes carrying a first fluid, the tubes running parallel to each other, each of the tubes being separated by a space there between; the plurality of tubes arranged to have a cross-sectional shape with a first side and a second opposite side; at least one layer of thermal buffer members on the first side of the tubes, and at least one layer arranged in a direction parallel to the tubes, each of the thermal buffer members being separated by a space there between; and a second fluid passing from the first side to the second side of the plurality of tubes, by first moving around the thermal buffer members then by moving past an exterior of the plurality of tubes.

In another aspect of the present invention, a heat exchanger, comprises a plurality of tubes carrying a first fluid, the tubes running parallel to each other, each of the tubes being separated by a space there between; the plurality of tubes arranged to have a cross-sectional shape with a first side and a second side; at least one layer of solid thermal buffer members on the first side of the tubes, and at least one layer arranged in a direction parallel to the tubes, each of the thermal buffer members being separated by a space there between; a second fluid passing from the first side to the second side of the plurality of tubes, by first moving around the solid thermal buffer members then by moving past an exterior of the plurality of tubes; and a gap in a longitudinal direction of each of the solid thermal buffer members located either within the thermal buffer members, thereby creating two thermal buffer members along the longitudinal direction separated by the gap, or at an end of the thermal buffer members, between the thermal buffer members and the heat exchanger, the gap being sufficient size to allow for thermal expansion of the thermal buffer members and not touch one another, thus not exerting stress on the heat exchanger.

In yet another aspect of the present invention, a heat exchanger for transferring heat from a first fluid to a second fluid, comprises a first set of tubes disposed adjacent to and running parallel with a second set of tubes, each of the first set of tubes and the second set of tubes carrying the second fluid; at least two layers of solid thermal buffer members on one side of the first set of tubes, arranged in a direction parallel to the first and second set of tubes; a gap in a longitudinal direction of the solid thermal buffer members, located either within the thermal buffer members, thereby creating two thermal buffer members along the longitudinal direction separated by the gap, or at an end of the thermal buffer members, between the thermal buffer members and the heat exchanger, the gap being sufficient size to allow for thermal expansion of the thermal buffer members without exerting stress on the heat exchanger; the first fluid passing first around the solid thermal buffer members then over an exterior of the first set of tubes, then over an exterior of the second set of tubes; and the first set of tubes having a diameter larger than the second set of tubes to improve the stiffness of the tubes that experience the greatest thermally induced buckling load.

In a further aspect of the present invention, a heat exchanger for transferring heat from a first fluid to a second fluid, comprises a first set of linear tubes disposed adjacent to and running parallel with a second set of linear tubes, each of the first set of tubes and the second set of tubes carrying the second fluid; each of the linear tubes in the first set of linear tubes being arranged with a space there between; at least two layers of linear, solid, rod-shaped thermal buffer members on one side of the first set of linear tubes, arranged in a direction parallel to the first and second set of linear tubes; each of the thermal buffer members in at least two layers being arranged with a space there between; a gap in the longitudinal direction of the solid thermal buffer members located either within the thermal buffer members, thereby creating two thermal buffer members along the longitudinal direction separated by the gap, or at an end of the thermal buffer members, between the thermal buffer members and the heat exchanger, the gap being sufficient size to allow for thermal expansion of the thermal buffer members and not touch one another, thus not exerting stress on the heat exchanger; at least two tube support baffle having holes therein, through which the tubes and the solid thermal buffer members traverse; the holes having a diameter larger than a diameter of the thermal buffer members to allow for limited movement; a spacer support tube, passing through and attached to the tube support baffle, for supporting and spacing apart the tube support baffle; the first set of linear tubes having a diameter larger than the second set of linear tubes; an inner bundle of tubes, the inner bundle of tubes having the first set of linear tubes and the second set of linear tubes; an outer bundle of tubes, the outer bundle of tubes having the first set of linear tubes and the second set of linear tubes; and the heat exchanger is of an annular shape, wherein the first fluid passes from an inner region of the annular shape to an exterior of the annular shape first through the thermal buffer members then through the inner bundle of tubes, then through the outer bundle of tubes. The second fluid may pass through the outer bundle of tubes and may then directed to the inner bundle of tubes, thereby resulting in an overall cross-counter flow arrangement.

In still a further aspect of the present invention, a method for transferring heat from a first fluid to a second fluid, comprises passing the second fluid through a plurality of tubes; arranging at least one layer of thermal buffer members on one side of the tubes in a direction parallel to the tubes; and passing the first fluid first around the thermal buffer members then over an exterior of the plurality of tubes.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a heat exchanger where high thermal stresses on the heat exchanger core, especially during startup and shutdown, may be avoided, thereby increasing the lifespan of the heat exchanger unit and improving life cycle costs. The heat exchanger uses an increased thermal mass to cause the temperature of the heat exchanger core to change in a more gradual manner, thereby reducing thermal stresses. This design may be useful in any high temperature heat exchanger environment where the warming of a fluid with a hot exhaust gas or an engine bleed air is desired, such as the heating of air for recuperated engines or for cooling engine bleed air in precoolers of aircraft, ships or land vehicles.

Conventional heat exchangers often have a short lifespan due to high thermal stresses acting on the core of the heat exchanger. In tubular heat exchangers, such thermal stresses may cause localized buckling due to differential thermal expansion across the cross section of the heat exchanger core. Heat exchangers that are of construction other than tubular also have thermal stresses imposed on the metal due to local and global temperature differences.

The present invention addresses the problems associated with high thermal stresses in a conventional heat exchanger by providing an increased thermal mass to more gradually adjust the temperature of the heat exchanger, thereby reducing thermal stress and increasing heat exchanger lifespan.

Figure 1:
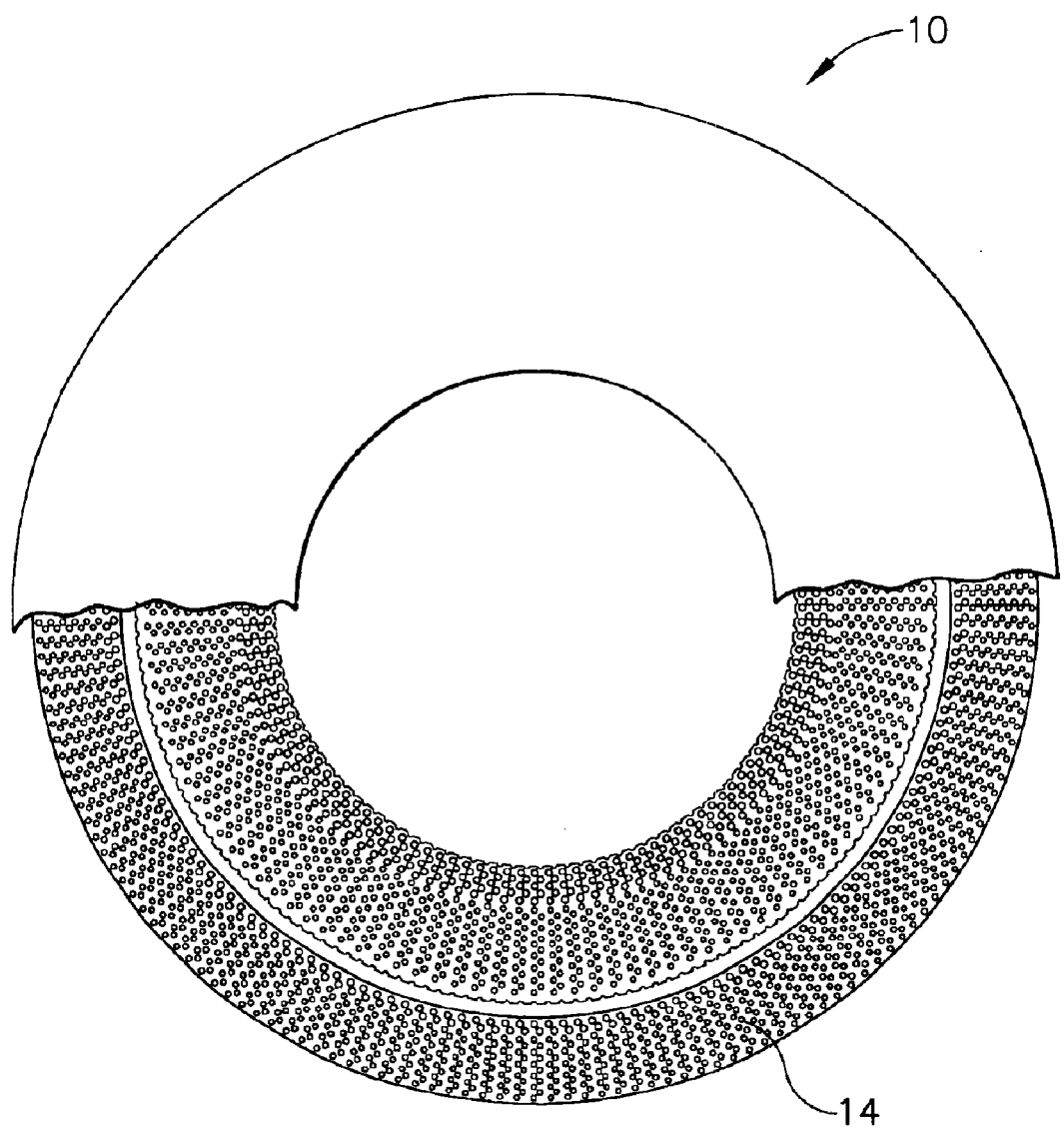
FIG. 1 is a cross-sectional view a heat exchanger according to the present invention.
Figure 2:
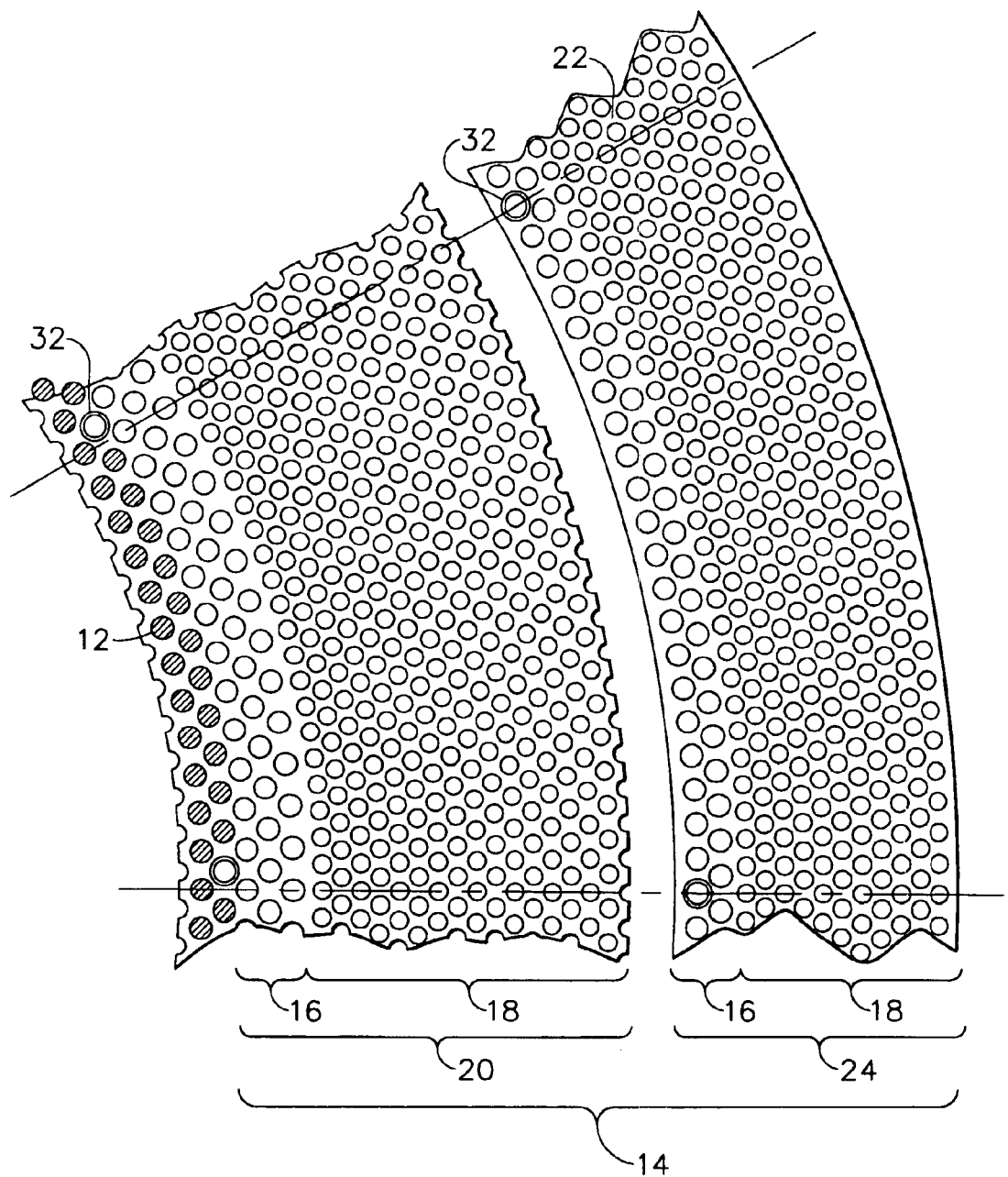
FIG. 2 is a cross-sectional close up view of a portion of the heat exchanger of FIG. 1.
Figure 3:
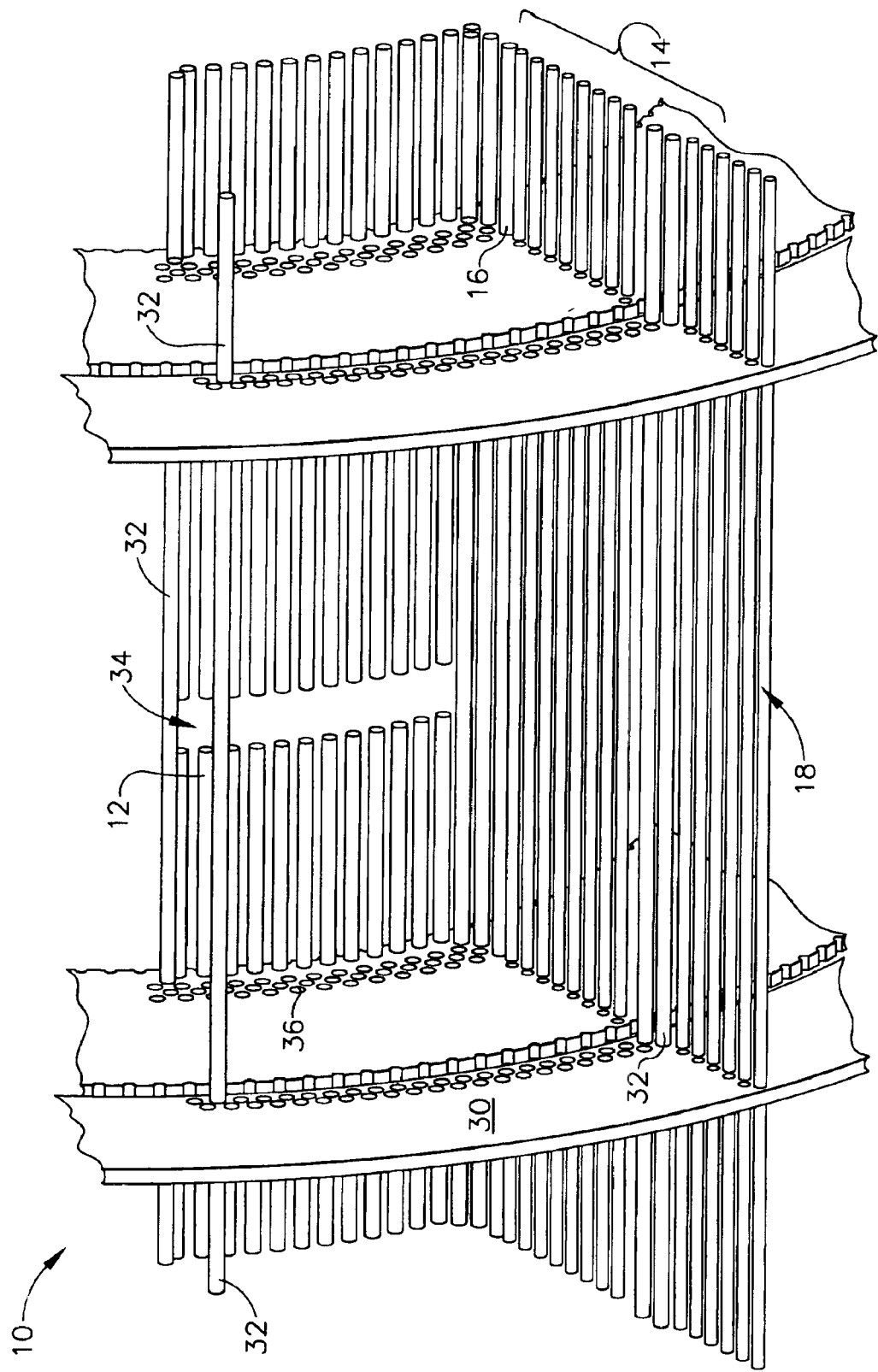
FIG. 3 is a longitudinal isometric view of a partially assembled tubular heat exchanger shown in FIG. 1.

Referring to FIGS. 1 through 3, there are shown views of the heat exchanger of the present invention. FIG. 1 shows a cross-sectional view of a heat exchanger 10 of the present invention, FIG. 2 shows a close-up of a portion of FIG. 1, and FIG. 3 shows a isometric view of a partially assembled (with some tubes removed for clarity) heat exchanger 10 using the design configuration of the present invention.

Referring to FIGS. 1, 2, and 3, heat exchanger 10 may be designed as an annular heat exchanger having rows of tubes 14. A first fluid flows through heat exchanger in the spaces 22 between tubes 14. A second fluid flows through tubes 14 of heat exchanger 10.

Tubes 14 may be composed of a first set of tubes 16 having a first diameter and a second set of tubes 18 having a second diameter. Preferably, the first diameter should be larger than the second diameter. This larger diameter may improve the stiffness of the tubes that experience the greatest thermally induced buckling load. Further, a preferred embodiment may include an inner bundle of tubes 20 having first set of tubes 16 and second set of tubes 18 and an outer bundle of tubes 24, also having first set of tubes 16 and second set of tubes 18. The diameter of first set of tubes 16 may be from about 0.1 to about 0.3 inches, preferably from about 0.12 to about 0.16 inches. The diameter of second set of tubes may be from about 0.05 to about 0.25 inches, preferably from about 0.1 to about 0.14 inches, however, any appropriate diameter may be selected, depending upon the heat exchanger's pressure drop, heat transfer requirements and duty cycle, as well as the resulting thermal stress environment. Tubes 14 are designed to have a length sufficient to transverse the entire length of heat exchanger 10. The size of heat exchanger 10 may be varied depending on the specific application.

In applications having both inner bundle of tubes 20 and outer bundle of tubes 24, the fluid flowing inside these tubes preferably passes through the interior of the outer bundle of tubes 24 before being directed through the interior of inner bundle of tubes 20. This results in an overall cross-counter flow arrangement of the fluid inside the tubes with respect to the fluid passing outside of the tubes. Spaces 22 allow the flow manifolding on the inner bundle of tubes 20 and the outer bundle of tubes 24 to be made separate from one another, thus enabling the tubes to grow in a more unconstrained manner, thus reducing stresses.

Thermal buffer members 12 may be used as the increased thermal mass to more gradually adjust the temperature of heat exchanger 10. Preferably, thermal buffer members 12 are solid and are made of a material having a thermal capacity at least equal that of tubes 14. A nickel/molybdenum/chromium alloy, such as Inconel 625 (Ni 61.0, Cr 21.05, Mo 9.0, Nb 3.6, Fe 2.5) may be one example of a suitable material for thermal buffer members 12. Thermal buffer members 12 may have any cross-sectional shape. While circular-shaped cross-sectional thermal buffer members 12 are shown in the Figures, elliptical or teardrop cross-sectional shaped thermal buffer members 12 may be used to lessen pressure drop across heat exchanger 10. Thermal buffer members 12 may also be formed as a sheet having holes there through for passing a fluid over the sheet-shaped thermal buffer members 12 and through tubes 14. Two sheet-shaped thermal buffer members 12 may be arranged parallel to each other in two layers, preferably having the holes through each of the sheets offset so that the fluid passing through heat exchanger 10 can not directly impinge upon the leading edge of tubes 14.

The spacing between thermal buffer members 12 may be selected to prevent direct hot fluid impingement upon the active portion (tubes 14) of heat exchanger 10. Preferably, thermal buffer members 12 are disposed in two rows with spacing between rods from about 0.01 to about 0.10 inches, more preferably from about 0.02 to about 0.03 inches. In one embodiment of the invention, the spacing of thermal buffer members 12 may be selected to match the spacing of first set of tubes 16. The spacing of thermal buffer members 12, as well as the choice of material for thermal buffer members 12, may be advantageously selected to result in the greatest heat transfer coefficient with minimum pressure drop within the constraints of cost and manufacturing limits.

As discussed above, thermal buffer members 12 act to increase thermal mass to more gradually adjust the temperature of heat exchanger 10. This increased heat exchanger thermal mass may be approximately from about 10 to 40%, preferably from about 20 to 25%, of the active heat exchanger mass, thereby substantially diminishing the thermal gradient that is transmitted to tubes 14 of heat exchanger 10, especially tubes 16. This lessened thermal gradient results in a dramatically reduced buckling load for the tubular heat exchanger 10. Thermal buffer members 12 act to lessen the thermal gradients when the second fluid temperature is increasing (i.e., during startup), as well as when the second fluid temperature is decreasing (i.e., shutdown). Moreover, the steady state operating temperature and performance of heat exchanger 10 are not affected because the thermal mass (thermal buffer members 12) will reach a steady state temperature equal to the incoming fluid temperature.

Referring now specifically to FIG. 3, there is shown an isometric view of a partially assembled (with some tubes 14 removed for clarity) heat exchanger 10 using the design configuration of the present invention. A plurality of tube support baffles 30 is disposed along the longitudinal axes of tubes 14. Spacer support members 32 are attached to tube support baffles 30 to provide support for tube support baffles 30. Spacer support members 32 have holes 36 there through to allow passage of tubes 14 and thermal buffer members 12. Advantageously, about 10 to about 20 spacer support members 32 are spaced within each of inner bundle of tubes 20 (not shown, see FIG. 2) and outer bundle of tubes 24 (not shown, see FIG. 2). Spacer support members 32 may be composed of any material suitable to the operating temperatures of heat exchanger 10 and may be hollow tubes or solid rods.

Because thermal buffer members 12 are designed to withstand impingement of the hot flow of the first fluid through heat exchanger 10, thermal buffer members 12 may heat more rapidly than tubes 14. Moreover, because thermal buffer members 12 may be chosen of a different material than tubes 14, the two materials may have a different thermal heat capacity and different coefficients of thermal expansion. Therefore, a gap 34 may be required in thermal buffer members 12 to allow for the possibility of differential thermal expansion. Generally, tubes 14 flow through the entire length of heat exchanger and are attached to the heat exchanger on both exterior walls at the end, while thermal buffer members 12 may be designed shorter than tubes 14, to allow for differential thermal expansion and contraction.

Gap 34 may be formed in any suitable location along the length of thermal buffer members 12. As shown in FIG. 3, gap 34 may be formed as a space along the length of thermal buffer member 12. In other words, along a linear length of a single thermal buffer member 12, there may be a space, resulting in two thermal buffer members 12 being used along the single linear length. Optionally, gap 34 may be formed at one end of thermal buffer member 12, the resulting gap 34 being between the end of thermal buffer member 12 and an exterior wall (not shown) of heat exchanger 10. Gap 34 allows for expansion of thermal buffer members 12 along the axial direction. Preferably, gap 34 may be made at one location in the first row of thermal buffer members 12 and at a different location along the second row of thermal buffer members 12. This would result in no location of tubes 14 being directly exposed to hot fluid flow without first encountering at least one layer of thermal buffer members 12. In addition to gap 34, holes 36 through spacer support/baffle 30 may be sized with a diameter larger than the diameter of thermal buffer members 12. This size difference may be chosen to allow room for differential thermal expansion of thermal buffer members 12 in their radial direction and allow for installation of the plurality of the tubes during manufacturing.

Heat exchanger 10 may be arranged in any number of configurations, so long as the fluid flow impinges on thermal buffer members 12 prior to contacting tubes 14. For example, tubes 14 may be arranged in an annular cross-sectional shape, with thermal buffer members 12 forming a concentric annulus inside the annular cross-sectional shape of tubes 14, as shown in the drawings. The fluid would then pass over the exterior of thermal buffer members 12 before contacting tubes 14. Tubes 14 may also be arranged to have a flat or rectangular cross-sectional shape. In this configuration, thermal buffer members 12 form at least one flat or rectangular layer on one side of tubes 14. The fluid would then pass through thermal buffer members 12 before contacting tubes 14. Other configurations, such as ellipses, ovals, arcs, and the like, are also possible.

Tubes 14 are preferably linearly arranged parallel to each other, having a space between each of the tubes. Tubes 14 are arranged such that thermal buffer members 12 can be placed in the flow of fluid so that the fluid must first pass around thermal buffer members 12 prior to contacting tubes 14. Preferably, thermal buffer members 12 are tubular shaped rods that are linearly arranged to run parallel to each other and parallel with tubes 14, with each of the rods being separated by a space there between. As noted above, any configuration of thermal buffer members 12 and tubes 14 is envisioned under the scope of the present invention, provided that the fluid flow first passes around thermal buffer members 14 before passing over tubes 12.

While the present invention has been described generally above, and more specifically in the example below, by using two rows of thermal buffer members 12, more than two rows of thermal buffer members 12 may be employed. The mass of heat exchanger 10 may be increased with an increased number of rows of thermal buffer members 12. This increase in rows may result in improved performance and lifespan of heat exchanger 10. On the other hand, a single row of thermal buffer members 12 may be employed. However, this single row may result in streaking of hot fluid to directly impinge upon tubes 14 of heat exchanger 10. While any number or rows of thermal buffer members 12 may be used, the present invention advantageously used from 1 to about 4 rows of thermal buffer members 12. Preferably, 2 or 3 rows of thermal buffer members 12 are used.

While the present invention has been described as a tubular heat exchanger, the concept of the present invention may be applicable to other types of heat exchangers. For example, one can envision a plate-fin type heat exchanger having at least one row of thermal buffer members 12 to more gradually adjust the temperature of the heat exchanger core and prevent direct impingement of the exterior fluid onto the heat exchanger core.

EXAMPLE

A heat exchanger 10 may be made of an inner tube bundle 20 and an outer tube bundle 24. Inner tube bundle 20 may comprise two rows of thermal buffer members 12, three rows of first set of tubes 16 and sixteen rows of second set of tubes 18. Thermal buffer members may be made of Inconel 625 and may have a diameter of about 0.145 inches. Each row of thermal buffer members 12 may be made of a circumference of 105 rods. First set of tubes 16 may have a diameter of about 0.145 inches and second set of tubes 18 may have a diameter of about 0.118 inches. Outer tube bundle 24 may comprise two rows of first set of tubes 16, as described above, and eleven rows of second set of tubes 18, also as described above.

A gas turbine engine may be started to idle for 60 seconds, then ramped over a 10 second period to full load, then sustained at full load for 40 seconds, then shut-down.

Figure 4:
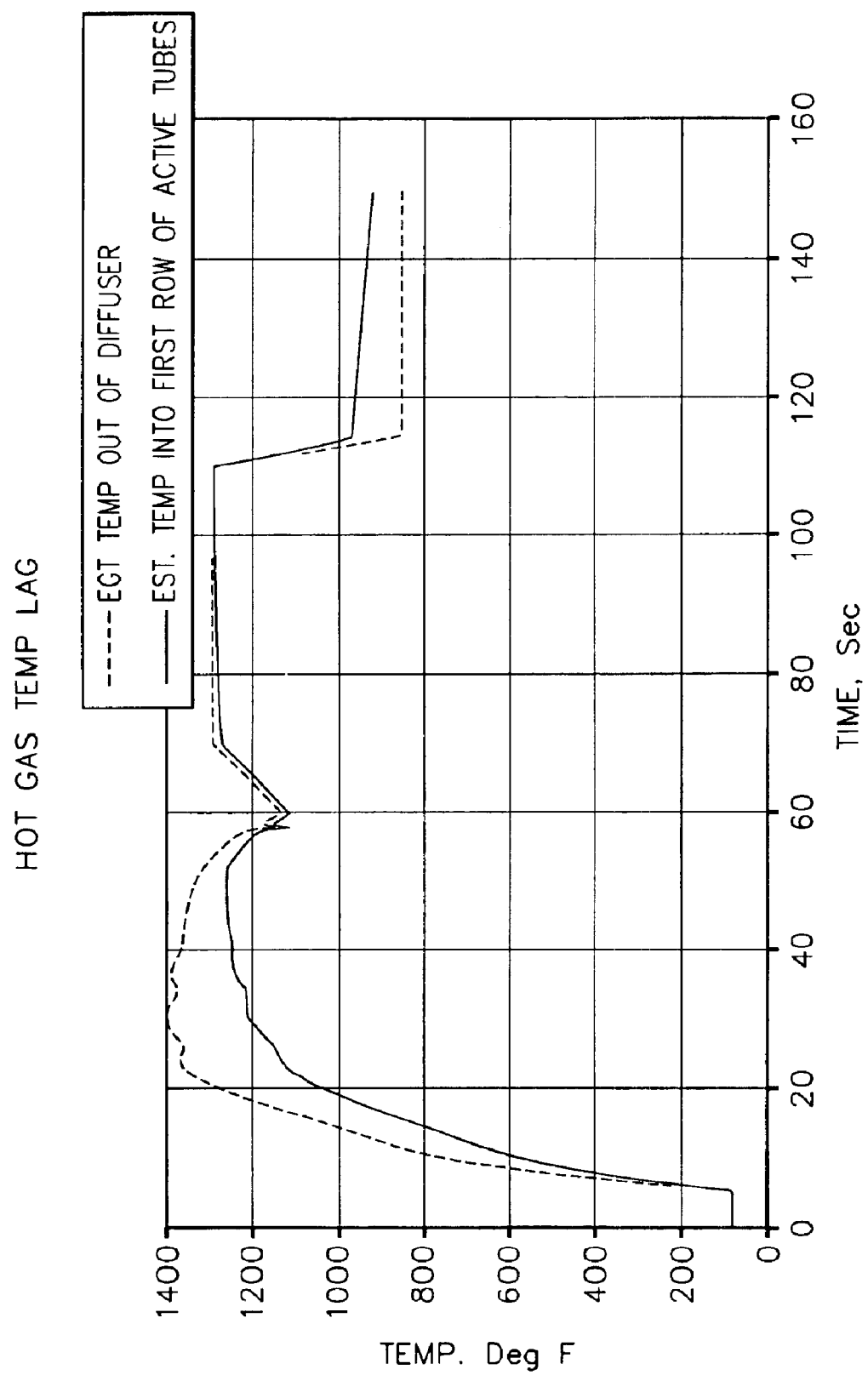
FIG. 4 is a graph showing the heat exchanger tube temperature, over time, when configured with the heat exchanger of the present invention.

Referring to FIG. 4, there is shown a graph showing the exhaust gas turbine temperature coming out of the engine diffuser for such an operation condition described in the previous paragraph for a gas turbine recuperator. Without the thermal buffer members of the present invention in place, the heat exchanger would experience the temperature gradients shown on this line of the graph. Plotted against the exhaust gas turbine temperature is the estimated (through finite differential analysis calculations) temperature into the first row of active tubes (active meaning carrying a fluid therein, such as tubes 14 of FIGS. 1 and 2).

The graph shows that, during startup, the peak hot gas temperature into the first row of active tubes is reduced by about 200 F degrees by using the two rows of thermal buffer members. After about 60 seconds, the idle temperature of the exhaust gas is in a steady state with the temperature of the first row of active tubes. During the 10 second ramp up to full load, the temperature increase of the exhaust gas is gradual enough that the temperature on the first row of active tubes is approximately the same. During shutdown from the steady state full load condition (beginning at 110 seconds on the graph), the graph shows a more gradual temperature decline when the thermal buffer members are used. Calculations show that the increased exhaust gas pressure drop is only about 0.3% with the two row thermal buffer member system.

As can be seen from the graph, the thermal buffer members protect the heat exchanger core by reducing the impact of the rapid increases or decreases in the temperature of the second fluid moving through the heat exchanger.

It should be understood, of course, that the foregoing relates to preferred embodiments of the invention and that modifications may be made without departing from the spirit and scope of the invention as set forth in the following claims.

We claim:

1. A heat exchanger, comprising:
   a plurality of tubes carrying a first fluid, said tubes running parallel to each other, each of said tubes being separated by a space there between;
   said plurality of tubes arranged to have a cross-sectional shape with a first side and a second opposite side;
   at least one layer of thermal buffer members on said first side of said tubes, said at least one layer arranged in a direction parallel to said tubes, each of said thermal buffer members being separated by a space there between and wherein each of said thermal buffer members has a diameter larger than the diameter of at least one tube of said plurality of tubes; and
   a second fluid passing from said first side to said second side of said plurality of tubes, by first moving around the exterior of said thermal buffer members then by moving past an exterior of said plurality of tubes.

2. The heat exchanger according to claim 1, wherein said at least one layer of thermal buffer members is one layer of thermal buffer members.

3. The heat exchanger according to claim 1, wherein said at least one layer of thermal buffer members is at least two layers of thermal buffer members.

4. The heat exchanger according to claim 1, wherein:
   said at least one layer of thermal buffer members is two layers of thermal buffer members; and
   said thermal buffer members are composed of a metal.

5. The heat exchanger according to claim 1 wherein:
   said first fluid is relatively cool compressor air; and
   said second fluid is engine hot exhaust gas.

6. The heat exchanger according to claim 1 wherein:
   said second fluid is hot engine bleed air; and
   said first fluid is cool air, relative to said second fluid.

7. The heat exchanger according to claim 1, wherein said tubes and said thermal buffer members are disposed in a linear arrangement.

8. The heat exchanger according to claim 1 wherein:
   said plurality of tubes has a first set of tubes and a second set of tubes running parallel to said first set of tubes;
   said first set of tubes contacting said second fluid prior to said second set of tubes; and
   wherein each tube of said first set of tubes has a diameter larger than each tube of said second set of tubes.

9. The heat exchanger according to claim 8, further comprising:
   an inner bundle of tubes, said inner bundle of tubes having said first set of tubes and said second set of tubes;
   an outer bundle of tubes, said outer bundle of tubes having said first set of tubes and said second set of tubes; and
   said first fluid passing through the interior of said outer bundle of tubes and then being directed through the interior of said inner bundle of tubes.

10. The heat exchanger according to claim 1, further comprising:
    at least one tube support baffle having holes therein, through which said tubes and said thermal buffer members traverse; and
    a spacer support tube, passing through and engaged to said tube support baffle, for supporting and spacing apart said tube support baffle to one another.

11. The heat exchanger according to claim 1, further comprising a gap in the longitudinal direction of said thermal buffer members, said gap being sufficient size to allow for thermal expansion of said thermal buffer members without exerting stress on said heat exchanger.

12. A heat exchanger, comprising:
   a plurality of tubes carrying a first fluid, said tubes running parallel to each other, each of said tubes being separated by a space there between;
   said plurality of tubes arranged to have a cross-sectional shape with a first side and a second opposite side;
   at least one layer of thermal buffer members on said first side of said tubes, said at least one layer arranged in a direction parallel to said tubes, each of said thermal buffer members being separated by a space there between;
   said plurality of tubes and said at least one layer of thermal buffer members both have an annular cross-sectional shape, thereby forming said heat exchanger in an overall annular shape;
   said at least one layer of thermal buffer members being concentrically disposed inside said annular cross-sectional shape of said plurality of tubes; and
   said second fluid passing from an inner region of said annular shape to an exterior of said annular shape first through said at least one layer of thermal buffer members then through said plurality of tubes.

13. A heat exchanger, comprising:
   a plurality of tubes carrying a first fluid internally, said tubes running parallel to each other, each of said tubes being separated by a space there between;
   said plurality of tubes arranged to have a cross-sectional shape with a first side and a second side;
   at least one layer of solid thermal buffer members on said first side of said tubes, said at least one layer arranged in a direction parallel to said tubes, each of said thermal buffer members being separated by a space there between;
   a second fluid passing from said first side to said second side of said plurality of tubes, by first moving around said solid thermal buffer members then by moving past an exterior of said plurality of tubes; and
   a gap in a longitudinal direction of each of said solid thermal buffer members located either within said thermal buffer members, thereby creating two thermal buffer members along said longitudinal direction separated by said gap, or at and end of said thermal buffer members, between said thermal buffer members and said heat exchanger, said gap being sufficient size to allow for thermal expansion of said thermal buffer members without exerting stress on said heat exchanger.

14. The heat exchanger according to claim 13, wherein:
   said at least one layer of solid thermal buffer members is two layers of solid thermal buffer members; and
   said solid thermal buffer members are composed of a metal.

15. The heat exchanger according to claim 14, wherein said metal is a nickel/molybdenum/chromium alloy.

16. The heat exchanger according to claim 13, wherein:
   said first fluid is relatively cool compressor air; and
   said second fluid is engine hot exhaust gas.

17. The heat exchanger according to claim 13, wherein:
   said second fluid is hot engine bleed air; and
   said first fluid is cool air relative to said second fluid.

18. The heat exchanger according to claim 13, further comprising:
   an inner bundle of tubes arranged in a circular configuration, said inner bundle of tubes having a first set of tubes and a second set of tubes running parallel to said first set of tubes;
   an outer bundle of tubes arranged in a circular configuration of concentric with the configuration of said inner bundle of tubes, but having a greater diameter, said outer bundle of tubes having said first set of tubes and said second set of tubes;
   said first set of tubes of each of said inner bundle and outer bundle contacting said second fluid prior to said second set of tubes; and
   wherein each tube of said first set of tubes has a diameter larger than each tube of said second set of tubes.

19. The heat exchanger according to claim 13, further comprising:
   at least two tube support/baffles having holes therein, through which said tubes and said thermal buffer members transverse; and
   a spacer support tube, passing through and attached to said tube support/baffles, for supporting and spacing apart said tube support/baffles.

20. A heat exchanger for transferring energy from a second fluid to a first fluid, comprising:
   a first set of tubes disposed adjacent to and running parallel with a second set of tubes, each of said first set of tubes and said second set of tubes carrying said first fluid;
   at least two layers of solid thermal buffer members on one side of said first set of tubes, arranged in a direction parallel to said first and second set of tubes;
   a gap in a longitudinal direction of said solid thermal buffer members, located either within said thermal buffer members, thereby creating two thermal buffer members along said longitudinal direction separated by said gap, or at an end of said thermal buffer members, between said thermal buffer members and said heat exchanger, said gap being sufficient size to allow for thermal expansion of said thermal buffer members without exerting stress on said heat exchanger;
   said second fluid passing first around said solid thermal buffer members then over an exterior of said first set of tubes, then over an exterior of said second set of tubes; and
   wherein each tube of said first set of tubes has a diameter larger than each tube of said second set of tubes.

21. The heat exchanger according to claim 20, wherein:
   said at least two layers of solid thermal buffer members is two layers of solid thermal buffer members; and
   said solid thermal buffer members are composed of a metal.

22. The heat exchanger according to claim 20, wherein:
   said first fluid is relatively cool compressor air; and
   said second fluid is engine hot exhaust gas.

23. The heat exchanger according to claim 20, wherein:
   said second fluid is hot engine bleed air; and
   said first fluid is cool air, relative to said second fluid.

24. The heat exchanger according to claim 20, further comprising:
   at least two tube support/baffles having holes therein, through which said tubes and said thermal buffer members transverse; and a spacer support tube, passing through and attached to said tube support/baffles, for supporting and spacing apart said tube support/baffles.

25. A heat exchanger for transferring energy from a second fluid to a first fluid, comprising:

a first set of linear tubes disposed adjacent to and running parallel with a second set of linear tubes, each of said first set of tubes and said second set of tubes carrying said first fluid;

each of said linear tubes in said first set of linear tubes being arranged with a space there between;

at least two layers of linear, solid, rod-shaped thermal buffer members on one side of said first set of linear tubes, arranged in a direction parallel to said first and second set of linear tubes;

each of said thermal buffer members in said at least two layers being arranged with a space there between;

a gap in the longitudinal direction of said solid thermal buffer members located either within said thermal buffer members, thereby creating two thermal buffer members along said longitudinal direction separated by said gap, or at an end of said thermal buffer members, between said thermal buffer members and said heat exchanger, said gap being sufficient size to allow for thermal expansion of said thermal buffer members without exerting stress on said heat exchanger;

at least one tube support baffle having holes therein, through which said tubes and said solid thermal buffer members traverse;

said holes having a diameter larger than a diameter of said thermal buffer members;

a spacer support tube, passing through and attached to said tube support/baffles, for supporting and spacing apart said tube support/baffles;

said first set of linear tubes having a diameter larger than said second set of linear tubes;

an inner bundle of tubes, said inner bundle of tubes having said first set of linear tubes and said second set of linear tubes;

an outer bundle of tubes, said outer bundle of tubes having said first set of linear tubes and said second set of linear tubes; and said heat exchanger is of an annular shape, wherein said second fluid passes from an inner region of said annular shape to an exterior of said annular shape first through said thermal buffer members then through said inner bundle of tubes, then through said outer bundle of tubes.

26. A heat exchanger for transferring energy from a second fluid to a first fluid, comprising:

a first set of tubes disposed adjacent to and running parallel with a second set of tubes, each of said first set of tubes and said second set of tubes carrying said first fluid, said first set of tubes having a diameter larger then said second set of tubes;

an inner bundle of tubes, said inner bundle of tubes having said first set of tubes and said second set of tubes; and an outer bundle of tubes, said outer bundle of tubes having said first set of tubes and said second set of tubes;

at least two layers of solid thermal buffer members on one side of said first set of tubes, arranged in a direction parallel to said first and second set of tubes;

a gap in a longitudinal direction of said solid thermal buffer members, located either within said thermal buffer members, thereby creating two thermal buffer members along said longitudinal direction separated by said gap, or at an end of said thermal buffer members, between said thermal buffer members and said heat exchanger, said gap being sufficient size to allow for thermal expansion of said thermal buffer members without exerting stress on said heat exchanger;

where in said heat exchanger is of an annular shape, wherein said second fluid passes from an inner region of said annular shape to an exterior of said annular shape first through said thermal buffer members then through said inner bundle of tubes, then through said outer bundle of tubes.

27. A method for transferring energy from a second fluid to a first fluid, comprising:

passing said second fluid through a plurality of tubes;

arranging at least one layer of thermal buffer members on one side of said tubes in a direction parallel to said tubes, said thermal buffer members having a diameter greater than said plurality of tubes; and passing said first fluid first around said thermal buffer members then over an exterior of said plurality of tubes.

28. The method according to claim 27, further comprising arranging two layers of thermal buffer members as said at least one layer of thermal buffer members.

29. The method according to claim 27, further comprising:

choosing relatively cool compressor air as said second fluid; and choosing engine hot exhaust gas as said first fluid.

30. The method according to claim 27, further comprising:

arranging said plurality of tubes as a first set of tubes and a second set of tubes running parallel to said first set of tubes, said first set of tubes contacting said second fluid prior to said second set of tubes, and said first set of tubes having a diameter larger than said second set of tubes.

31. The method according to claim 27, further comprising:

disposing at least two tube support/baffles, having holes therein, through which said tubes and said thermal buffer members traverse; and passing through and attaching a spacer support tube to said at least two tube support/baffles to support and space apart said tube support/baffles.

32. The method according to claim 27, further comprising providing a gap in the longitudinal direction of said thermal buffer members, said gap being sufficient size to allow for thermal expansion of said thermal buffer members without exerting stress on said heat exchanger.

* * * * *